UNITED STATES PATENT OFFICE.

ROBERT ROHLAND, OF NEW YORK, N. Y.

IMPROVEMENT IN PREPARATION OF KOUMISS.

Specification forming part of Letters Patent No. 175,760, dated April 4, 1876; application filed February 21, 1876.

*To all whom it may concern:*

Be it known that I, ROBERT ROHLAND, of the city and State of New York, have invented an Improvement in the Manufacture of Koumiss, of which the following is a specification:

The nutritious beverage made by the Tartars from mare's milk, and known as "Koumiss," is possessed of very useful medicinal properties. The carbonic acid that exists in the same is produced by fermentation, and it is difficult to check this fermentation at the proper time; hence the bottles containing the same are liable to burst, and the caseine is lumpy and does not mix uniformly, but has to be agitated before being used.

The object of my invention is to make the koumiss complete and uniform, so that there will not be any change by fermentation, or by the lapse of a reasonable time between the manufacture and use of the article. By this improvement the koumiss is adapted to being transported, the bottles are not liable to burst, and the beverage is more palatable than that heretofore made.

I employ either fresh cow's milk or condensed milk in the manufacture of the koumiss. If condensed milk is used I add about four times its bulk of warm water, and dissolve in it sugar until the saccharometer indicates 8.6°, and if fresh milk is used about one-quarter its bulk of warm water is to be added with the sugar, the object being to render the liquid of a composition similar to mare's milk. I now add yeast in about the proportion of one ounce compressed yeast, or three table-spoonfuls of fresh liquid yeast, to four and a half gallons, tasteless and colorless yeast preferred, and stir the same well and place it in a warm place, say, 65° to 70° Fahrenheit, and allow it to ferment, and agitate it from time to time and skim off the butter and other floating particles, and allow the fermentation to proceed eight or ten hours, and filter the liquid through a clean piece of muslin in order to remove a part of the caseine, and allow the fermentation to proceed until it is exhausted. The liquid is now charged with carbonic-acid gas in any of the known agitators similar to those used in the manufacture of soda or mineral water, and the material should be subjected to a pressure of about one hundred and fifty pounds for siphons and fountains, and fifty to eighty pounds for bottles. This operation prevents any further fermentation, and fully saturates the liquid with carbonic-acid gas. This is very important, as the koumiss is preserved, and its medicinal properties promoted by the carbonic acid. A uniform amount of carbonic acid is introduced into the koumiss, and the pressure will be easily determined, so that risk of the bottles bursting is prevented.

The koumiss is free from the lumpy disagreeable appearance usual in consequence of the precipitated caseine, as such caseine is dissolved fully by the carbonic acid, and the koumiss remains uniformly liquid, or nearly so.

This koumiss can be kept in any suitable vessels. It may be bottled like soda-water or champagne, or it may be drawn off through siphons or fountains, so as to be convenient for use as a beverage, with all the effervescing properties of soda-water, and with the nutritive and medicinal properties of koumiss.

The koumiss may be mixed with milk charged with carbonic acid, or there may be sirups and flavoring extracts added, either in the liquid, or, preferably, into the tumbler receiving the liquid.

I do not claim the manufacture of koumiss from cow's milk; neither do I claim the introduction of carbonic acid into milk by agitation.

I claim as my invention—

The method herein described of manufacturing koumiss by fermentation, and the introduction of carbonic acid, substantially as set forth.

Signed by me this 16th day of February, A. D. 1876.

ROBERT ROHLAND.

Witnesses:
GEO. D. WALKER,
CHAS. H. SMITH.